Aug. 27, 1968     P. BÄTTIG     3,398,860

METERING DEVICES FOR LIQUIDS

Filed Oct. 18, 1965

United States Patent Office 3,398,860
Patented Aug. 27, 1968

3,398,860
METERING DEVICES FOR LIQUIDS
Paul Bättig, Basel, Switzerland, assignor to Cutter Laboratories, Inc., Berkeley, Calif., a corporation of Delaware
Filed Oct. 18, 1965, Ser. No. 496,839
8 Claims. (Cl. 222—46)

This invention relates to the fine metering of liquids, as is necessary, for example, in medicine in the case of parenteral infusions, and in the chemical industry in the case of titration of solutions and for controlling certain processes in which a liquid must be introduced into a reaction vessel in an accurately metered quantity. This has hitherto been carried out by varying the cross-section of the pipe or the like carrying the liquid in question at one point. For this purpose the tubing carrying the liquid in parenteral infusions is constricted by a pinching or kinking device, and the chemical industry either uses the same method of fine metering or provides a regulating valve in the liquid pipe. In such methods of varying the flow cross-section, at least if a round flow opening is provided, the flow resistance increases to the fourth power with the radius and the rate of flow accordingly decreases to the fourth power. This means that the lower the drip rate the more critical the regulation of the rate of flow becomes. A fairly common rate of approximately 20 drops per minute corresponds roughly to 1 ml. To regulate such a rate with an accuracy of ±10–15%, a nurse, for example, needs 2 to 5 minutes. A drip rate of 5 min., however, as is often clinically desirable, is practically impossible to set up.

Instead of constricting the tubing or pipe at only one point it would be possible to insert a capillary tube in the tubing or pipe. The rate of flow would then be in linear proportion to the length of the capillary tube. Such a solution is hardly practical, because the length of the capillary tube would have to be altered in order to regulate the rate of flow. Then there is also the possibility of using, instead of a simple capillary tube, a narrow tube in which a pin having approximately the same diameter is displaceably fitted so that an annular capillary channel of variable length is formed. As, however, it is desirable to be able to vary the rate of flow in a ratio of 1:50 to 1:100, such a dosing device would have to be so long that it would not be practical to use. Moreover such an impractically long dosing device would offer no guarantee of reliable and rapid operation by staff who are not sufficiently technically skilled, for example, nurses. These disadvantages can be removed by the invention.

The invention relates to a device for fine metering of liquids, which consists of a tubular body to which the liquid is supplied at one end and from which the liquid is withdrawn at the other end, and a pin fitting exactly in the tubular body and inserted in one end thereof so as to be axially displaceable, the device being characterised by the feature that a helical capillary channel is provided in the internal surface of the tubular body or in the external surface of the pin.

In such a device the rate of flow is regulated by axial displacement of the pin in relation to the tubular body and thus varying the extent of penetration in the tubular body, i.e. by lengthening or shortening the capillary channel according to the particular requirements. However, owing to the helical capillary channel, the range of adjustment with a given length of the dosing device is according to the pitch of the helix a multiple of that possible in a metering device with a straight annular capillary channel.

Advantageously the pin is provided with a threaded part and the tube with an internal thread corresponding to this threaded part, the capillary channel being formed by removing part of the ridge of the screw-thread of the threaded part of the pin or of the internal thread of the tubular body. Such a design of the device for fine metering of liquids makes possible and extremely simple and exact adjustment of the rate of flow required within very wide limits, which can be carried out very rapidly even by unskilled staff.

Two embodiments of the device for fine metering of liquids according to the invention are shown in the drawing, as well as variants of parts of the second embodiment. In the drawings.

Figure 1:
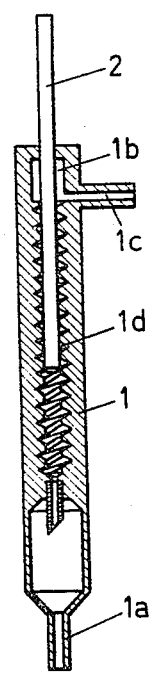
FIGURE 1 shows an axial section through the first embodiment of the device.

The device for fine metering of liquids shown in FIGURE 1 comprises a tube 1 with ground bore, which at one end has a nozzle 1a for connecting a delivery pipe, not shown, for example a piece of tubing to which an infusion needle is connected. In the end of this tube 1 remote from the nozzle 1a a ground pin 2 is inserted in an axially displaceable manner with an exact press fit, and can be moved in the tube 1 only by using a certain force, so that it cannot be displaced unintentionally. In the end part of the tube 1 remote from the nozzle 1a is provided an annular chamber 1b surrounding the pin 2, into which opens an inlet connection 1e fitted on the side of the tube 1. In the inner wall of the tube 1 is provided a helical capillary channel 1d opening towards the plug 2 and extending from the chamber 1b to the nozzle 1a.

In such a device for fine metering of liquids the rate of flow of a liquid of a certain viscosity depends on the pressure of the liquid and on the flow resistance of the capillary channel 1d, i.e. on its cross-sectional area and effective length, that is to say on the extent of introduction of the pin 2 in the tube 1. The pressure of the liquid can easily be kept sufficiently constant, by placing a relatively large storage vessel containing the liquid at a certain height. The effective length of the capillary channel 1d can be varied by displacing the pin 2 in the tube 1 and, as the variation in length of the capillary channel 1d, which follows a spiral, is a multiple of the path of displacement of the pin 2, regulation of the flow rate is possible within very wide limits by means of a relatively short device.

Figure 2:
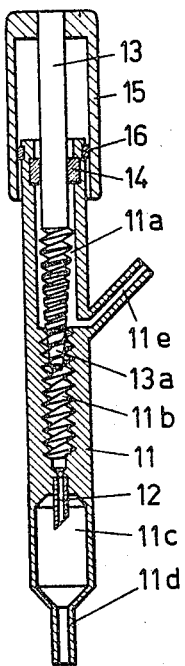
FIGURE 2 is an axial section through the second embodiment of the device.
Figure 3:
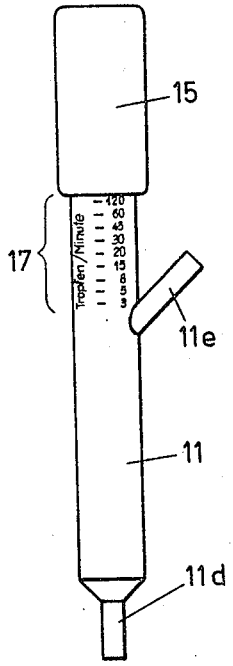
FIGURE 3 is a front view of the device according to FIGURE 2.

The device for fine dosing of liquids according to FIGURES 2 and 3 has a body 11 of transparent material, one end of which has a wide axial bore 11a which adjoins a narrower threaded bore 11b. The threaded bore 11b opens into a calibrated drip tube 12 inserted in the body 11 and projecting into a chamber 11c provided in the body 11. This chamber 11c should be sufficiently long for the drops to be able to drip freely from the drip tube 12 and be observed and counted and moreover for there to be sufficient room for a supply of liquid. The chamber 11c should therefore be at least 15–30 mm. long. The end part of the body 11 containing the chamber 11c comprises a nozzle 11d connected to the chamber 11c and adapted for connection of the delivery pipe for the liquid whose flow rate is to be measured. The supply of liquid always present in the chamber 11e during use of the device prevents air from entering the nozzle 11d and hence the delivery pipe. Into the bottom of the wider bore 11a of the body 11, before the threaded bore 11b, opens a connecting nozzle 11e provided on the side of the body 11 and to which the pipe supplying the liquid is connected. A pin 13 which is guided in a sealed manner in a packing ring 14 of rubber or the like, greased with a little silicon grease, has a threaded part 13a, which can be screwed into the threaded bore 11b of the body 11. The ridges of the threads of the threaded part 13a are partly removed but only to such an extent that they remain in engagement with the threads of the threaded bore 11b and no leakage can occur. In this way the portion of the troughs not filled by the ridges of the threads of the threaded part 13a of the pin 13 forms a capillary channel following a spiral and extending from the bottom of the bore 11a, into which the liquid is introduced, to the drip tube 12. A cap 15 covering the upper end of the body 11 is fitted over the outer end of the pin 13. A packing ring 16 of cellulose wadding inserted in a groove in this end part of the body and bearing on the cap 15 forms a seal between the body 11 and cap 15 to prevent penetration of bacteria and the like.

Figure 4:
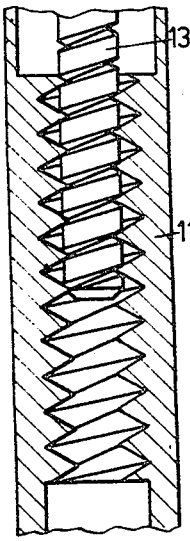
FIGURE 4 is an axial section through the capillary part of a variant of the device according to FIGURE 2.
Figure 6:
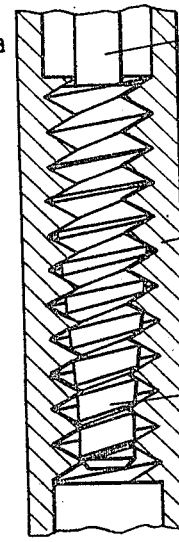
FIGURE 6 is an axial section through the capillary part of a third variant of the device according to FIGURE 2.
Figure 7:
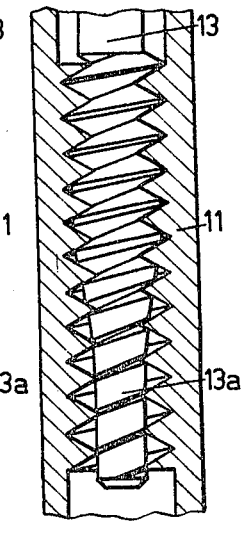
FIGURE 7 is an axial section through the capillary part of a fourth variant of the device according to FIGURE 2.

The further the threaded part 13a of the pin 13 is screwed into the threaded bore 11b of the body 11, the longer becomes the effective length of the capillary channel and hence the smaller the rate of flow. If the ridges of the threads of the threaded part 13a of the pin 13 are removed the same amount over its entire length, as shown in FIGURE 4, the cross-sectional area of the channel is constant over its entire length and the rate of flow decreases linearly with the extent of screwing in. However the ridges of the threads of the threaded part 13a of the pin 13 may also be removed to a constantly increasing extent towards the free front end of the threaded part 13a, over its entire length as shown in FIGURE 2, or, as shown in FIGURE 6, only over part thereof. In this way the cross-sectional area of the capillary channel increases towards the free end of the threaded part 13a of the pin 13. The result of this is that the rate of flow decreases not linearly but progressively as the threaded part 13a is screwed into the threaded bore 11b. This is a great advantage in many cases in which it is desired still to be able to effect an accurate fine metering even with a very low flow rate of a few drops per minute. A further refinement of the metering can be obtained if the ridges of the threads of the threaded part 13a of the pin 13 are removed not uniformly but, as shown in FIGURE 7, so that the surface lines of the surface of revolution enclosing this threaded part 13a follow a non-linear function, e.g. an e-function. In this way one can obtain, for example, a semi-logarithmic increase or decrease in the flow rate, which is ideal for parenteral drip infusions, as an exact regulation is possible even in the case of very low flow rates of a few drops per minute.

Figure 5:
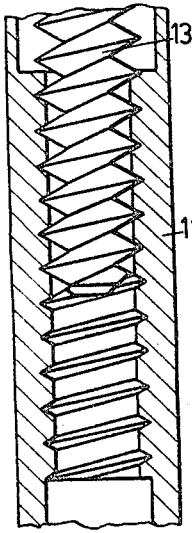
FIGURE 5 is an axial section through the capillary part of another variant of the device according to FIGURE 2.

Instead of removing the ridges of the threads of the threaded part 13a of the pin 13, as is the case in the embodiments described above, naturally the ridges of the threads of the threaded bore 11b of the body 11 could also be removed in a corresponding manner, as is shown for example in FIGURE 5.

At the end part of the body 11 over which the cap 15 is placed, a scale 17 is provided, from which using the edge of the cap 15 as a marker, one can read off the particular flow rate of a liquid of certain viscosity at a certain pressure, e.g. a pressure of 100 cm. $H_2O$, as drops per minute or as ml. A condition of this is that the drip tube 12 should be previously calibrated. Two or more such scales 17 can be provided, each of which is associated with a liquid of a certain viscosity and/or a certain pressure.

It is expedient, as shown for example in FIGURE 6, to leave the ridge of 1 to 2 turns complete at one end, in this case the outer end, of the threaded part 13a. This makes it possible to use the metering device as a closing member also. If desired the ridge of 1 to 2 turns may also be left at both ends of the threaded part 13a.

The threaded bore 11b of the body 11 and the threaded part 13a of the pin 13 must be machined very accurately, so that no leakage occurs between two adjacent turns. The ridge of the thread of the threaded bore 11b of the body 11 should have a press fit in the depression of the thread of the threaded part 13a of the pin 13. In order to achieve this, at least the body 11 or both the body 11 and the pin 13 are made preferably of plastic material, a hard material being used for the pin 13 and a somewhat softer and more elastic plastic for the body 11, and the diameter of the threaded bore 11b of the body 11 being made approximately 1/1000 smaller than the diameter of threaded part 13a. Suitable material combinations for the body 11 and the pin 13 are, for example, nylon and epoxy resin, polythethylene and acrylic resin, polytetrafluoromethane and V2A steel. Preferably the tube 1 or the body 11 is made of transparent plastic, so that the dripping of the liquid from the drip tube 12 into the chamber 11c and the filling of the chamber 11c can be watched and the drops counted. Preferably the tube 1 or body 11 and the pin 2 or 13 are also made of a material permitting sterilisation in steam without parts thereof being deformed in any way.

The devices described for fine metering of liquids are applicable to all cases in which the rate of flow of a liquid must be exactly regulated, and they are particularly suitable in medicine for parenteral infusions of all types and in chemistry for the titration of solutions and for controlling certain processes by introducing a liquid into a reaction vessel in an exactly measured amount. Of particular advantage is the possibility of being able to set up accurately and very rapidly even very low flow rates of a few drops per minute, without particularly skilled staff being required.

The devices described for fine metering of liquids may if desired also be equipped with an adjusting motor which accurately regulates the flow rate in an automatic manner in dependence on a certain factor, for example in parenteral infusions on the blood pressure, in chemical processes on the pressure and/or the temperature in the reaction vessel.

If, for example a parenteral infusion is to be effected at a pressure of 100 cm. $H_2O$, the infusion bottle is suspended or placed approximately 110 cm. above the point of insertion of the infusion needle, in order to compensate the pressure in the veins or arteries amounting to approximately 10 cm. $H_2O$.

Preferably a filter, not shown in the drawing, is provided in the supply pipe connected to the inlet nozzle 1c of the tube 1 or the nozzle 11e of the body 11, in order to separate solid particles carried by the fluid, for example blood curds in the case of blood transfusions.

I claim:

1. In a device for fine metering of liquids, which consists of a tubular body to which the liquid is supplied at one end, and from which the liquid is withdrawn at the other end, and a pin fitting exactly in the tubular body and inserted in one end thereof so as to be axially displaceable, providing a helical capillary channel in the internal surface of the tubular body or in the external surface of the pin, the improvement consisting in that the tubular body has at one end a nozzle and at its other end a wide axial bore, into which opens a connecting nozzle provided on the side of the body, the nozzles being connected by a threaded bore, and that the pin, the threaded part of which is screwable into this threaded bore, is guided in a sealing ring inserted in the end part of the body and closing the bore of the latter, and is provided at its outer end with a cap fitting over the end of the body, the edge of which serves as a marker for at least one scale provided on the outside of this end part of the body and indicating the flow rate set for a certain pressure and a certain viscosity of the liquid.

2. In a device as claimed in claim 1, the improvement consisting in that in the end part of the body provided with the outlet nozzle between the threaded bore and the nozzle there is provided a chamber, into which projects a calibrated drip tube introduced into the opening in the threaded bore.

3. In a device as claimed in claim 2, the improvement consisting in that at least the tubular body is made of transparent plastic.

4. In a device as claimed in claim 3, the improvement consisting in that both the pin with its threaded part and the tubular body consist of plastic, which can be sterilised in steam without becoming deformed, and that the pin with its threaded part consists of hard plastic and the body of softer, more elastic plastic, the threaded bore of the tubular body being approximately $\frac{1}{1000}$th smaller than the largest diameter of the threaded part of the pin.

5. In a device as claimed in claim 1, the improvement consisting in that the ridge of the thread of the threaded part of the pin or of the threaded bore of the tubular body is partially removed to form the capillary channel.

6. In a device as claimed in claim 5, the improvement consisting in that the edge of the thread is removed to an increasing extent over at least part of its length.

7. In a device as claimed in claim 5, the improvement consisting in that the edge of the thread is removed to an increasing extent towards its free end in accordance with an $e$-function or another non-linear function.

8. In a device as claimed in claim 5, the improvement consisting in that the ridge is not removed from about one to two turns at at least one end of the thread bore of the tubular body or the threaded part of the pin from which the ridge of the thread is removed.

References Cited

UNITED STATES PATENTS

| | | | |
|---|---|---|---|
| 1,431,860 | 10/1922 | Zurbrigg | 222—421 |
| 2,188,802 | 1/1940 | Beckett | 222—420 |
| 2,283,915 | 5/1942 | Cole | 222—158 X |
| 2,312,834 | 3/1943 | Hahn | 138—43 |
| 2,323,115 | 6/1943 | Bryant | 138—43 |
| 2,568,123 | 9/1951 | Goldberg | 138—43 |
| 2,658,528 | 11/1953 | Ifield | 138—43 |
| 2,778,528 | 1/1957 | Corcoran | 222—46 |
| 3,108,716 | 10/1963 | Panek et al. | 222—48 |

ROBERT B. REEVES, *Primary Examiner.*